US012482479B2

(12) United States Patent
Nakatani et al.

(10) Patent No.: US 12,482,479 B2
(45) Date of Patent: Nov. 25, 2025

(54) ACOUSTIC SIGNAL ENHANCEMENT APPARATUS, METHOD AND PROGRAM

(71) Applicant: NIPPON TELEGRAPH AND TELEPHONE CORPORATION, Tokyo (JP)

(72) Inventors: Tomohiro Nakatani, Tokyo (JP); Rintaro Ikeshita, Tokyo (JP); Keisuke Kinoshita, Tokyo (JP); Hiroshi Sawada, Tokyo (JP); Shoko Araki, Tokyo (JP)

(73) Assignee: NTT, Inc., Tokyo (JP)

( * ) Notice: Subject to any disclaimer, the term of this patent is extended or adjusted under 35 U.S.C. 154(b) by 156 days.

(21) Appl. No.: 18/277,547

(22) PCT Filed: Feb. 25, 2021

(86) PCT No.: PCT/JP2021/007090
§ 371 (c)(1),
(2) Date: Aug. 16, 2023

(87) PCT Pub. No.: WO2022/180741
PCT Pub. Date: Sep. 1, 2022

(65) Prior Publication Data
US 2024/0127841 A1 Apr. 18, 2024

(51) Int. Cl.
*G10L 21/0232* (2013.01)
*G10L 21/0308* (2013.01)

(52) U.S. Cl.
CPC ...... *G10L 21/0232* (2013.01); *G10L 21/0308* (2013.01)

(58) Field of Classification Search
CPC ....... G10L 2021/02082; G10L 21/0308; G10L 21/0232
(Continued)

(56) References Cited

U.S. PATENT DOCUMENTS

2011/0142252 A1* 6/2011 Morito ................ G10L 21/0272
381/92

OTHER PUBLICATIONS

Jakatanietal.(2010)Speechdereverberationbasedonvariance-normalizeddelayedlinearprediction,IEEETrans. udio,Speech,andLanguageProcessing,vol. 18,No. 7,pp. 1717-1731,[retrievedon Feb. 10, 2021],Internet URL:https://ieeexplore.ieee.org/stamp/stampjsp?tp=&amumber=5547558> (Year: 2010).*
(Continued)

*Primary Examiner* — Yosef K Laekemariam

(57) ABSTRACT

An acoustic signal enhancement device includes: a spatiotemporal covariance matrix estimation unit 2 configured to estimate spatiotemporal covariance matrices $R_f^{(j)}$ and $P_f^{(j)}$; a reverberation suppression unit 3 configured to obtain a reverberation suppression filter $G_f^{(j)}$ of the sound source j using the estimated spatiotemporal covariance matrices $R_f^{(j)}$ and $P_f^{(j)}$ for each sound source j and to generate a reverberation suppression signal vector using the obtained reverberation suppression filter $G_f^{(j)}$ and the observation signal vector $X_{t,f}$; a sound source separation unit 4 configured to obtain an enhanced sound $y_{t,f}^{(j)}$ of the sound source j and power of the sound source j using the generated reverberation suppression signal vector for each sound source j (where 1≤j≤J) corresponding to the target sound; and a control unit 5 configured to perform control such that processes of these units are repeatedly performed.

7 Claims, 6 Drawing Sheets

(58) Field of Classification Search
USPC .......................................................... 381/73.1
See application file for complete search history.

(56) References Cited

OTHER PUBLICATIONS

Nakatani et al. (2020) “Jointly Optimal Denoising, Dereverberation, and Source Separation,” IEEE/ACM Transactions on Audio, Speech, and Language Prosessing, vol. 28, Jul. 31, 2020, pp. 2267-2282.
Ikeshita et al. (2021) “Independent Vector Extraction for Joint Blind Source Separation and Dereverberation”, Feb. 9, 2021, Internet <URL: https://arxiv.org/abs/2102.04696v1>.
Nakatani et al. (2020) “Computationally Efficient and Versatile Framework for Joint Optimization of Blind Speech Separation and Dereverberation”, Posted on Oct. 19, 2020, Internet <URL: https://www.isca-speech.org/archive/pdfs/interspeech_2020/nakatani20_interspeech.pdf> Presented at Interspeech 2020, Oct. 25-29, 2020, in Shanghai, China.
Nakatani et al. (2010) “Speech dereverberation based on variance-normalized delayed linear prediction”, IEEE Trans. Audio, Speech, and Language Processing, vol. 18, No. 7, pp. 1717-1731, [retrieved on Feb. 10, 2021], Internet <URL: https://ieeexplore.ieee.org/stamp/stamp.jsp?tp=&arnumber=5547558>.
Ikeshita et al. (2020) “Overdetermined independent vector analysis, Proc. IEEE ICASSP”, Trans. Audio, Speech, and Language Processing, pp. 591-595, [retrieved on Feb. 10, 2021] Internet <URL: https://arxiv.org/pdf/2003.02458.pdf>.

* cited by examiner

ACOUSTIC SIGNAL ENHANCEMENT APPARATUS, METHOD AND PROGRAM

CROSS-REFERENCE TO RELATED APPLICATIONS

This application is a U.S. 371 Application of International Patent Application No. PCT/JP2021/007090, filed on 25 Feb. 2021, the disclosure of which is hereby incorporated herein by reference in its entirety.

TECHNICAL FIELD

The present invention relates to an acoustic signal enhancement technology for separating an acoustic signal, which is a mixture of a plurality of sounds and reverberations thereof and other noise collected by a plurality of microphones, into individual sounds in a situation in which there is no prior information regarding each constituent sound and simultaneously suppressing reverberations.

BACKGROUND ART

In the related art, a reverberation suppression method of simultaneously suppressing reverberation related to all constituent sounds in a situation in which there is no prior information regarding each constituent sound is known (for example, see Non Patent Literature 1).

A method of simultaneously implementing noise suppression and sound source separation in a situation in which there is no reverberation is known (for example, see, Non Patent Literature 2).

Accordingly, as illustrated in FIG. 6, by sequentially applying the two processes as a reverberation suppression step and a sound source separation noise suppression step, it is possible to simultaneously implement sound source separation, reverberation suppression, and noise suppression.

CITATION LIST

Non Patent Literature

Non Patent Literature 1: Tomohiro Nakatani, et al. "Speech dereverberation based on variance-normalized delayed linear prediction", IEEE Trans. Audio, Speech, and Language Processing, vol. 18, no. 7, pp. 1717-1731, 2010. [retrieved on Feb. 10, 2021], Internet <URL: https://ieeexplore.ieee.org/stamp/stamp.jsp?tp=&arnumber=5547558>

Non Patent Literature 2: Rintaro Ikeshita, Tomohiro Nakatani, Shoko Araki, "Overdetermined independent vector analysis, Proc. IEEE ICASSP", Trans. Audio, Speech, and Language Processing, pp. 591-595, 2020. [retrieved on Feb. 10, 2021], Internet <URL: https://arxiv.org/pdf/2003.02458.pdf>

SUMMARY OF INVENTION

Technical Problem

However, in the reverberation suppression step of the background art, a process is performed independently of what process is performed in the sound source separation step of the previous stage. Therefore, in the background art, an optimum process cannot be performed as a whole when reverberation suppression and sound source separation are simultaneously performed.

An objective of the present invention is to provide an acoustic signal enhancement device, method, and program capable of performing an optimum process as a whole.

Solution to Problem

According to an aspect of the present invention, an acoustic signal enhancement device includes: a spatiotemporal covariance matrix estimation unit configured to estimate spatiotemporal covariance matrices $R_f^{(j)}$ and $P_f^{(j)}$ using power of a sound source j and an observation signal vector $X_{t,f}$ formed from an observation signal $x_{t,f}^{(m)}$ of a microphone m for each sound source j when t is a time frame number, f is a frequency number, M is the number of microphones, m=1, . . . M, there are a target sound and noise in the sound source, J is the number of target sounds, M>J, j=1, . . . , J+1, j of 1≤j≤J indicates a sound source corresponding to the target sound, and J+1 indicates a sound source corresponding to the noise; a reverberation suppression unit configured to obtain a reverberation suppression filter $G_f^{(j)}$ of the sound source j using the estimated spatiotemporal covariance matrices $R_f^{(j)}$ and $P_{(j)}$ for each sound source j and to generate a reverberation suppression signal vector using the obtained reverberation suppression filter $G_f^{(j)}$ and the observation signal vector $X_{t,f}$; a sound source separation unit configured to obtain an enhanced sound $y_{t,f}^{(j)}$ of the sound source j and power of the sound source j using the generated reverberation suppression signal vector for each sound source j (where 1≤j≤J) corresponding to the target sound; and a control unit configured to perform control such that a process of the spatiotemporal covariance matrix estimation unit, a process of the reverberation suppression unit, and a process of the sound source separation unit are repeatedly performed.

Advantageous Effects of Invention

By individually obtaining the spatiotemporal covariance matrix only for each sound source and noise and using the spatiotemporal covariance matrix for reverberation suppression, an optimal process can be performed as a whole.

DESCRIPTION OF EMBODIMENTS

Figure 1:
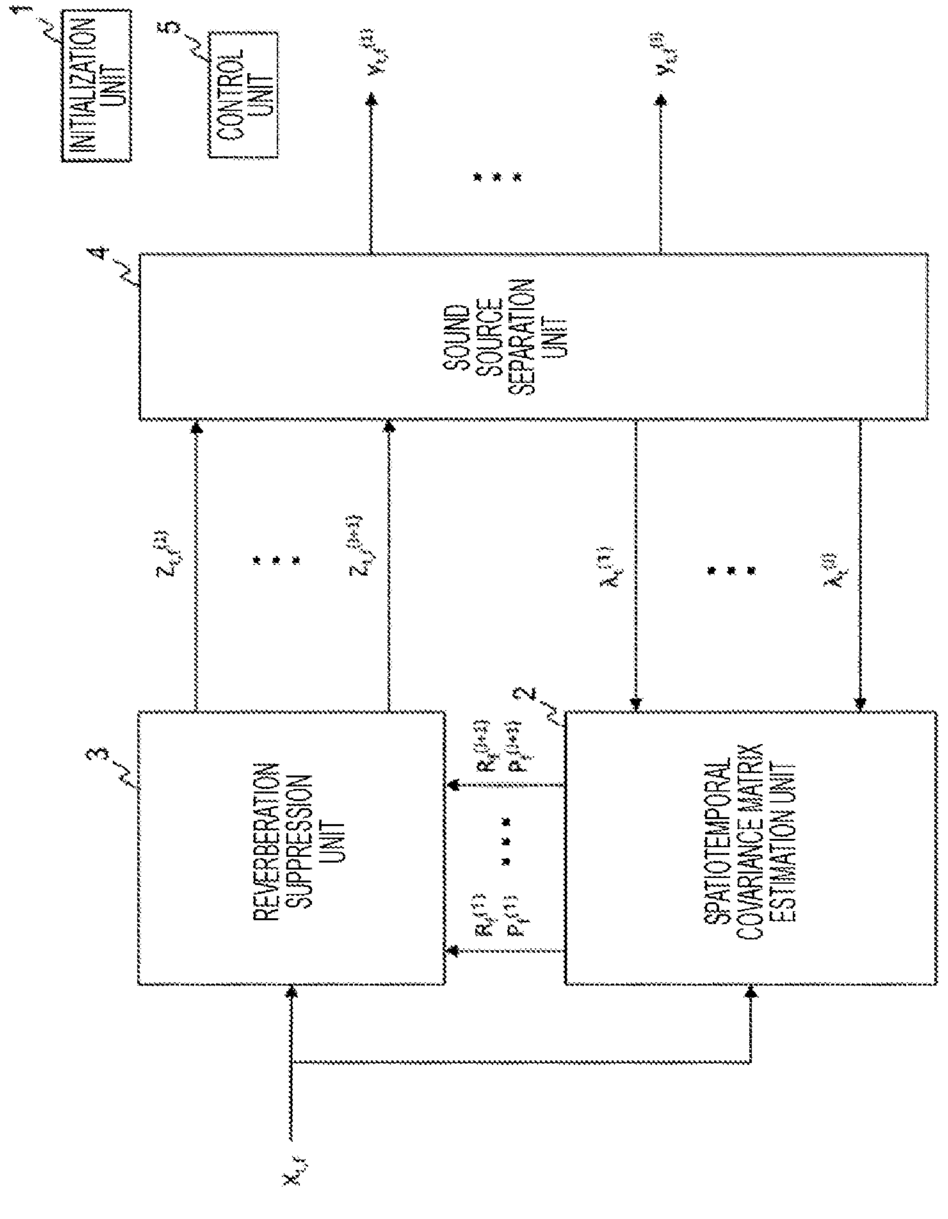
FIG. 1 is a diagram illustrating an example of a functional configuration of an acoustic signal enhancement device according to a first embodiment.

Hereinafter, embodiments of the present invention will be described. In the drawings, constituents having the same functions are denoted by the same reference numerals, and redundant description will be omitted.

First Embodiment

As illustrated in FIG. 1, an acoustic signal enhancement device includes, for example, an initialization unit 1, a spatiotemporal covariance matrix estimation unit 2, a reverberation suppression unit 3, a sound source separation unit 4, and a control unit 5.

In the acoustic signal enhancement device according to the first embodiment, a different reverberation suppression filter for each sound source is obtained and used.

Figure 2:
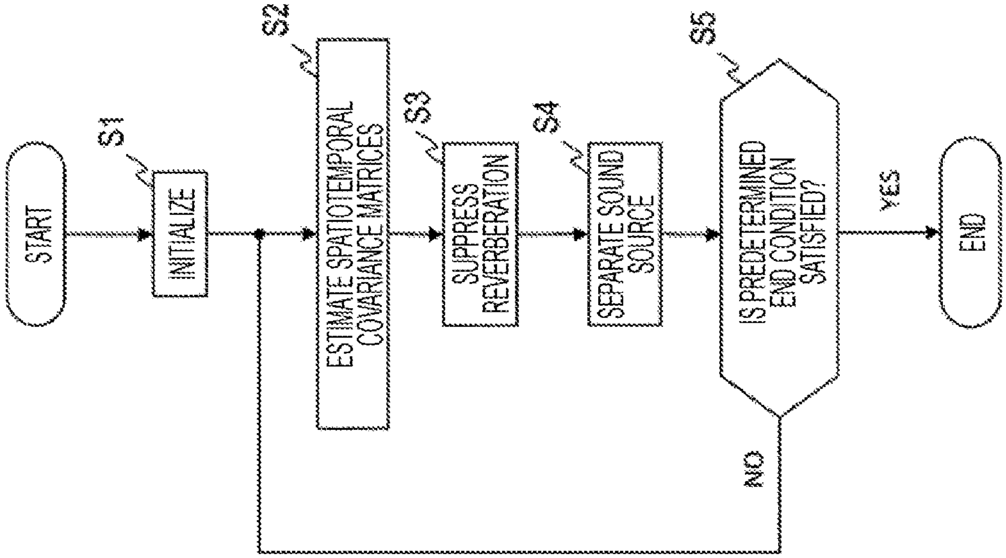
FIG. 2 is a diagram illustrating an example of a processing procedure of an acoustic signal enhancement method.

The acoustic signal enhancement method is implemented, for example, by each constituent unit of the acoustic signal enhancement device performing processes of steps S1 to S5 to be described below and illustrated in FIG. 2.

The symbol "‾" used in a text would normally be written immediately above the immediately following character, but is written immediately before the character due to limitations of text notation. In mathematical expressions, these symbols are described at their normal positions, that is, directly above the characters. For example, "‾X" in a text is described as follows in a mathematical expression.

$$\overline{X}$$ [Math 1]

First, the way the symbols are used will be described.

M is the number of microphones and m (where $1 \le m \le M$) is a microphone number. M is a positive integer equal to or greater than 2. In principle, the microphone number is indicated by an upper right subscript. For example, it is expressed as $x_{t,f}^{(m)}$.

J is the number of target sounds.

j is a sound source number. In $1 \le j \le J$, j indicates a sound source that is a target sound, and J+1 indicates a sound source that is noise.

t, τ (where $1 \le t, \tau \le T$) is a time frame number. T is a total number of time frames, and is a positive integer equal to or greater than 2.

f (where $1 \le f \le F$) is a frequency number. The sound source is represented by an upper right subscript, and the time and frequency are indicated by a lower right subscript. For example, it is expressed as $x_{t,f}^{(n)}$. F is a frequency corresponding to a highest frequency bin.

$(\cdot)^T$ is a non-conjugate transpose of a matrix or a vector, and $(\cdot)^H$ is a conjugate transpose of the matrix or vector. · is any matrix or vector.

Lowercase letters of the alphabet are scalar variables. For example, an observation signal $x_{t,f}^{(m)}$ at a time t and a frequency f in a microphone m is a scalar variable.

Uppercase letters of the alphabet represent vectors or matrices. For example, $X_{t,f}=[x_{t,f}^{(1)}, x_{t,f}^{(2)}, \ldots, x_{t,f}^{(M)}]^T \in C^{M\times 1}$ is an observation signal vector in all microphones at the time t and the frequency f.

$C^{M\times N}$ is an entire set of M×N dimensional complex matrices. $X \in C^{M\times N}$ is a notation indicating that it is its element. That is, X indicates a $C^{M\times N}$ element.

$\overline{X}_{t-D,f}=[X_{t-D,f}^T, \ldots, x_{t-L+1,f}^T]^T \in C^{M(L-D)\times 1}$ is a past observation signal time-series vector from a time t−L+1 to a time t−D.

$\lambda_t^{(j)}$ is power of a sound source j at the time t and is a scalar.

$y_{t,f}^{(j)}$ is an enhanced sound of the sound source j at the time t and the frequency f and is a scalar.

$G_f^{(n)} \in C^{M(L-D)\times M}$ is a reverberation suppression filter of the sound source j at the frequency f. L is a filter order and is a positive integer equal to or greater than 2. D is a prediction delay and is a positive integer equal to or greater than 1.

$Q_f=[Q_f^{(1)}, Q_f^{(2)}, \ldots, Q_f^{(M)}]^T \in C^{M\times M}$ is a separation matrix of the frequency f. $Q_f^{(j)}$ is a separation filter of the sound source j.

$R_f^{(j)} \in C^{M(L-D)\times M(L-D)}$, $P_f^{(j)} \in C^{M(L-D)\times M}$ is a spatiotemporal covariance matrix for each sound source at the frequency f.

Hereinafter, each constituent unit of the acoustic signal enhancement device will be described.

<Initialization Unit 1>

With j=1, . . . , J, the initialization unit 1 initializes power $\lambda_t^{(j)}$ of each sound source j, a reverberation suppression filter $G_f^{(j)}$, and a separation matrix $Q_f=[Q_f^{(1)}, Q_f^{(2)}, \ldots, Q_f^{(M)}]^T \in C^{M\times M}$.

The power $\lambda_t^{(j)}$ of the initialized sound source j is output to the spatiotemporal covariance matrix estimation unit 2. The initialized reverberation suppression filter $G_f^{(j)}$ is output to the reverberation suppression unit 3. The initialized separation matrix $Q_f$ is output to the sound source separation unit 4. The power $\lambda_t^{(j)}$ of the initialized sound source j may be output to the sound source separation unit 4 as necessary.

For example, the initialization unit 1 initializes these variables by setting the power $\lambda_t^{(j)}$ of the sound source j as the power of the observation signal $x_{t,f}^{(m)}$, setting the reverberation suppression filter $G_f^{(j)}$ as a matrix in which all elements are 0, and setting the separation matrix $Q_f$ as an identity matrix. Of course, the initialization unit 1 may initialize these variables in accordance with another method.

<Spatiotemporal Covariance Matrix Estimation Unit 2>

The spatiotemporal covariance matrix estimation unit 2 receives the power $\lambda_t^{(j)}$ of the sound source j initialized by the initialization unit 1 or updated by the sound source separation unit 4 and the observation signal vector $X_{t,f}$ including the observation signal $x_{t,f}^{(m)}$ of the microphone m.

For each sound source j, the spatiotemporal covariance matrix estimation unit 2 estimates the spatiotemporal covariance matrices $R_f^{(j)}$ and $P_f^{(j)}$ by using the power $\lambda_t^{(j)}$ of the sound source j and the observation signal vector $X_{t,f}$ including the observation signal $x_{t,f}^{(m)}$ of the microphone m (step S2).

That is, the spatiotemporal covariance matrix estimation unit 2 estimates the spatiotemporal covariance matrices $R_f^{(1)}$, $P_f^{(1)}$, $R_f^{(J)}$, and $P_f^{(J)}$ respectively corresponding to the sound sources 1, . . . , and J corresponding to the target sound. By estimating the spatiotemporal covariance matrices $R_f^{(j)}$ and $P_f^{(j)}$ for each of the sound sources 1, . . . , and J corresponding to the target sound and using them for reverberation suppression, it is possible to implement an acoustic signal enhancement method with high calculation efficiency while performing overall optimization.

In addition, the spatiotemporal covariance matrix estimation unit 2 estimates the spatiotemporal covariance matrices $R_f^{(J+1)}$ and $P_f^{(J+1)}$ corresponding to the sound source J+1 corresponding to noise. Even if there is a plurality of pieces of noises, the spatiotemporal covariance matrix estimation unit 2 estimates one spatiotemporal covariance matrix $R_f^{(J+1)}$ and $P_f^{(J+1)}$ common to the plurality of pieces of noises. As a result, the calculation amount can be reduced further than in a case where the spatiotemporal covariance matrices $R_f^{(J+1)}$ and $P_f^{(J+1)}$ corresponding to each piece of noise are estimated.

The estimated spatiotemporal covariance matrices $R_f^{(j)}$ and $P_f^{(j)}$ are output to the reverberation suppression unit 3.

The spatiotemporal covariance matrix estimation unit 2 estimates the spatiotemporal covariance matrices $R_f^{(j)}$ and $P_f^{(j)}$ based on, for example, the following expression.

$$R_f^{(j)}=\Sigma_t \overline{X}_{t-D}\overline{X}_{t-D}^H/\lambda_t^{(j)}$$

$$P_f^{(j)}=\Sigma_t \overline{X}_{t-D} X_t^H/\lambda_t^{(j)}$$ [Math. 2]

Here, for example, it is assumed that noise power $\lambda_t^{(J+1)}=1$.

In the first process, the spatiotemporal covariance matrix estimation unit 2 performs a process using the power $\lambda_t^{(j)}$ of the sound source j initialized by the initialization unit 1. In the second and subsequent processes, the spatiotemporal covariance matrix estimation unit 2 performs the process using the power $\lambda_t^{(j)}$ of the sound source j updated by the sound source separation unit 4.

<Reverberation Suppression Unit 3>

The reverberation suppression unit 3 receives inputs of the spatiotemporal covariance matrices $R_f^{(j)}$ and $P_f^{(j)}$ estimated by the spatiotemporal covariance matrix estimation unit 2 and an observation signal vector $X_{t,f}$ including an observation signal $x_{t,f}^{(m)}$ of the microphone m.

For each sound source j, the reverberation suppression unit 3 obtains the reverberation suppression filter $G_f^{(j)}$ of the sound source j by using the estimated spatiotemporal covariance matrices $R_f^{(j)}$ and $P_f^{(j)}$ and generates the reverberation suppression signal vector $Z_{t,f}^{(j)}$ corresponding to the observation signal $x_{t,f}^{(m)}$ regarding the enhanced sound of the sound source j by using the obtained reverberation suppression filter $G_f^{(j)}$ and the observation signal vector $X_{t,f}$ (step S3).

That is, the reverberation suppression unit 3 generates the reverberation suppression filters $G_f^{(1)}, \ldots,$ and $G_f^{(J)}$ and the reverberation suppression signal vectors $Z_{t,f}^{(1)}, \ldots, Z_{t,f}^{(J)}$ respectively corresponding to the sound sources 1, . . . , and J corresponding to the target sound.

Further, the reverberation suppression unit 3 generates a reverberation suppression filter $G_f^{(J+1)}$ and a reverberation suppression signal vector $Z_{t,f}^{(J+1)}$ corresponding to the sound source J+1 corresponding to noise. Even if there are a plurality of pieces of noises, the reverberation suppression unit 3 obtains one reverberation suppression filter $G_f^{(J+1)}$ common to the plurality of pieces of noises and one noise separation matrix $Q_{N,f}$. The noise separation matrix $Q_{N,f}$ will be described below.

The generated reverberation suppression signal vector $Z_{t,f}^{(j)}$ is output to the sound source separation unit 4.

Here, when $Z_{t,f}^{(j)}=[z_{1,t,f}^{(j)}, \ldots, z_{M,t,f}^{(j)}]$ and m=1, . . . , M, $z_{m,t,f}^{(j)}$ is a reverberation suppression signal corresponding to the observation signal $x_{t,f}^{(m)}$ regarding the enhanced sound of the sound source j.

The reverberation suppression unit 3 generates a reverberation suppression filter $G_f^{(j)}$ based on, for example, the following expression.

$$G_f^{(j)}=(R_f^{(j)})^{-1} P_f^{(j)} \text{ for } j \in[1,J+1] \quad \text{[Math. 3]}$$

Further, the reverberation suppression unit 3 generates a reverberation suppression signal vector $Z_{t,f}^{(j)}$ based on the following expression, for example.

$$Z_{t,f}^{(j)}=X_{t,f}-(G_f^{(j)})^H \bar{X}_{t-D,f} \ldots (A) \quad \text{[Math. 4]}$$

<Sound Source Separation Unit 4>

The reverberation suppression signal vector $Z_{t,f}^{(j)}$ generated by the reverberation suppression unit 3 is input to the sound source separation unit 4.

The sound source separation unit 4 obtains the enhanced sound $y_{t,f}^{(j)}$ of the sound source j and the power $\lambda_t^{(j)}$ of the sound source j using the generated reverberation suppression signal vector $Z_{t,f}^{(j)}$ for each sound source j (where $1 \le j \le J$) corresponding to the target sound (step S4).

That is, the reverberation suppression unit 3 generates enhanced sounds $y_{t,f}^{(1)}, \ldots, y_{t,f}^{(J)}$ and power $\lambda_t^{(1)}, \ldots, \lambda_t^{(1)}$ respectively corresponding to the sound sources 1, . . . , J corresponding to the target sound.

The obtained enhanced sound $y_{t,f}^{(j)}$ of the sound source j is output from the acoustic signal enhancement device. Further, the obtained power $\lambda_t^{(j)}$ of the sound source j is output to the spatiotemporal covariance matrix estimation unit 2.

Hereinafter, an example of a process of the sound source separation unit 4 will be described. The sound source separation unit 4 may obtain the enhanced sound $y_{t,f}^{(j)}$ of the sound source j and the power $\lambda_t^{(j)}$ of the sound source j in accordance with a scheme of the related art other than a scheme to be described below.

In this example, the power $\lambda_t^{(j)}$ of the sound source j initialized by the initialization unit 1 is further input to the sound source separation unit 4.

The sound source separation unit 4 finally obtain an enhanced sound $y_{t,f}^{(j)}$ of the sound source j by repeating: (1) a process of obtaining a spatial covariance matrix $\Sigma_f^{(j)}$ corresponding to the sound source j using the reverberation suppression signal vector $Z_{t,f}^{(j)}$ and the power $\lambda_t^{(j)}$ of the sound source j as j=1, . . . , J+1; (2) a process of updating a separation filter $Q_f^{(j)}$ corresponding to the sound source j using the obtained spatial covariance matrix $\Sigma_f^{(j)}$, updating the enhanced sound $y_{t,f}^{(j)}$ of the sound source j using the updated separation filter $Q_f^{(j)}$ and the reverberation suppression signal vector $Z_{t,f}^{(j)}$, and updating the power $\lambda_t^{(j)}$ of the sound source j using the updated enhanced sound $y_{t,f}^{(j)}$, as j=1, . . . , J; and (3) a process of updating the noise separation matrix $Q_{N,f}$ using the updated separation filter $Q_f^{(j)}$, as j=1, . . . , J.

That is, the sound source separation unit 4 finally obtains the enhanced sounds $y_{t,f}^{(1)}, \ldots, y_{t,f}^{(J)}$ of the sound sources 1, . . . , J by repeating: (1) a process of obtaining the spatial covariance matrices $\Sigma_f^{(1)}, \ldots, \Sigma_f^{(J+1)}$ corresponding to the sound sources 1, . . . , J+1 using the reverberation suppression signal vectors $Z_{t,f}^{(1)}, \ldots, Z_{t,f}^{(J+1)}$ and the power $\lambda_t^{(1)}, \ldots, \lambda_t^{(J+1)}$ of the sound sources 1, . . . , J+1; (2) a process of updating the separation filters $Q_f^{(1)}, \ldots, Q_f^{(J)}$ corresponding to the sound sources 1, . . . , J using the obtained spatial covariance matrices $\Sigma_f^{(1)}, \ldots, \Sigma_f^{(J)}$, updating the enhanced sounds $y_{t,f}^{(1)}, \ldots, y_{t,f}^{(J)}$ of the sound sources 1, . . . , J using the updated separation filters $Q_f^{(1)}, \ldots, Q_f^{(J)}$ and the reverberation suppression signal vectors $Z_{t,f}^{(1)}, \ldots, Z_{t,f}^{(J)}$, and updating the power $\lambda_t^{(1)}, \ldots, \lambda_t^{(J)}$ of the sound sources 1, . . . , J using the updated enhanced sounds $y_{t,f}^{(1)}, \ldots, y_{t,f}^{(J)}$; and (3) a process of updating the noise separation matrix $Q_{N,f}$ using the updated separation filters $Q_f^{(1)}, \ldots, Q_f^{(J)}$.

The processes (1) to (3) are not required to be repeatedly performed. That is, in the process of step S4 performed once, the processes (1) to (3) may be performed only once.

The enhanced sound $y_{t,f}^{(j)}$ of the finally obtained sound source j is output from the acoustic signal enhancement device. Further, the power $\lambda_t^{(j)}$ of the finally updated sound source j is output to the spatiotemporal covariance matrix estimation unit 2. Further, the updated separation matrix $Q_f$ is output to the reverberation suppression unit 3.

The sound source separation unit 4 obtains the spatial covariance matrix $\Sigma_f^{(j)}$ corresponding to the sound source j based on the following expression, for example.

$$\Sigma_f^{(j)}=\Sigma_t Z_{t,f}^{(j)}(Z_{t,f}^{(j)})^H/\lambda_t^{(j)} \quad \text{[Math. 5]}$$

The sound source separation unit 4 updates the separation filter $Q_f^{(j)}$ based on the following Expressions (1) and (2), for example. More specifically, the separation filter $Q_f^{(j)}$ is updated by substituting $Q_f^{(j)}$ obtained by Expression (1) into the right side of Expression (2) to calculate $Q_f^{(j)}$ defined by Expression (2).

[Math. 6]

$$Q_f^{(j)} = \left(Q_f^H \textstyle\sum_f^{(j)}\right)^{-1} e_j \quad (1)$$

[Math. 7]

$$Q_f^{(j)} = Q_f^{(j)} / \left\| Q_f^{(j)} \right\|_{\Sigma_f^{(j)}} \quad (2)$$

Here, when j=1, . . . , J, $e_j$ is a J-dimensional vector in which the j-th element is 1 and the other elements are 0.

The sound source separation unit 4 updates the enhanced sound $y_{t,f}^{(j)}$ of the sound source j based on the following expression, for example.

$$y_{t,f}^{(j)}=(Q_f^{(j)})^H Z_{t,f}^{(j)} \ldots (B) \qquad \text{[Math. 8]}$$

The sound source separation unit 4 updates the power $\lambda_t^{(j)}$ of the sound source j based on the following expression, for example.

[Math. 9]

$$\lambda_t^{(j)} = \frac{1}{F}\sum_{f=0}^{F-1}\left|y_{t,f}^{(j)}\right|^2 \text{ for } j \in [1, J] \quad (C)$$

The sound source separation unit 4 updates the noise separation matrix $Q_{N,f}$ based on the following expression, for example. That is, the sound source separation unit 4 updates the separation matrix $Q_f$ by updating the portion of the noise separation matrix $Q_{N,f}$ in the separation matrix $Q_f$ based on the following expression.

$$Q_{N,f}=(-(Q_{S,f}{}^H\Sigma_f^{(j+1)}E_S)_{l_{M-j}}{}^{-1}(Q_{S,f}{}^H\Sigma_f^{(j+1)}E_N)) \qquad \text{[Math. 10]}$$

Here, $Q_{S,f}=[Q_f^{(1)}, \ldots, Q_f^{(J)}]$, $Q_{N,f}=[Q_f^{(J+1)}, \ldots, Q_f^{(M)}]$, and $E_s$ is $E_S \in R^{M\times J}$ and is the first J columns (that is, the first to J-th columns) of the identity matrix $I_M \in R^{M\times M}$. $E_N$ is a matrix of $E_N \in R_{M\times(M-J)}$, and is the remaining M−J columns (that is, the (J+1)-th to M-th columns) of the identity matrix $I_M \in R^{M\times M}$. $I_{M-J}$ is an identity matrix and is $I_{M-J} \in R^{M-J\times M-J}$.

In this way, a calculation amount can be reduced by calculating the noise separation matrix $Q_{N,f}$ in one step regardless of the number of pieces of noise.

<Control UNIT 5>

The control unit 5 performs control such that the process of the spatiotemporal covariance matrix estimation unit 2, the process of the reverberation suppression unit 3, and the process of the sound source separation unit 4 are repeatedly performed (step S5).

For example, the control unit 5 repeatedly performs the processes until a predetermined end condition is satisfied. An example of the predetermined end condition is that a predetermined variable such as the enhanced sound $y_{t,f}^{(j)}$ of the sound source j converges. Another example of the predetermined end condition is that the number of times the process is repeatedly performed reaches a predetermined number of times.

In this way, by feeding the result of the sound source separation back to the process of the reverberation suppression unit 3 and repeating all the processes, it is possible to perform an optimum process as a whole. By estimating the spatiotemporal covariance matrices $R_f^{(j)}$ and $P_f^{(j)}$ for each sound source j, it is not necessary to consider a relationship between the sound sources for each sound source. Therefore, it is possible to reduce the size of the matrix required for optimization. Therefore, it is possible to reduce the overall calculation cost.

In the first embodiment, all the parameters are optimized by one optimization criterion in order to perform the overall optimization. An example of one optimization criterion is a criterion expressed by the following Expression (3).

[Math. 11]

$$L(\theta) = -\sum_{i,f}\left[\sum_{j\in\lceil t,j\rceil}\left(\log\lambda_t^{(j)} + \frac{\left|y_{t,f}^{(j)}\right|^2}{\lambda_t^{(j)}}\right)\right] + \sum_{j\in\lceil J+1,M\rceil}\left|y_{t,f}^{(j)}\right|^2 + 2T\sum_f \log|\det Q_f| \quad (3)$$

For example, it can be said that the foregoing process implements optimization by obtaining the reverberation suppression filter $G_f^{(j)}$, the separation filter $Q_f^{(j)}$, the separation sound power $\lambda_f^{(j)}$, the reverberation suppression filter $G_f^{(j+1)}$ common to all noise, and the noise separation matrix $Q_{N,f}$ of each target sound that maximizes Expression (3).

Expression (3) is a criterion derived based on the maximum likelihood method in consideration of the process according to Expressions (A) and (B) under the following two assumptions.

The first assumption is that the separation sound of each target sound follows a complex Gaussian distribution in which the power $\lambda_f^{(j)}$ changes over time.

The second assumption is that the noise has power following a time-invariant complex Gaussian distribution.

In general, when the reverberation suppression step (step S3) is compared with the sound source separation step (step S4), the former requires a large calculation cost required for one repetition, and the latter requires many repetitions until convergence. In the first embodiment, by executing the sound source separation step a plurality of times in one repetition, it is possible to perform control such that faster convergence (=an increase in the number of updates of the sound source separation noise suppression step) is obtained while suppressing the calculation cost as a whole (=updating of a small reverberation suppression step).

In the foregoing example, the power $\lambda_t^{(j)}$ of the sound source j is calculated by Expression (C). Since this Expression (C) takes a power average in the frequency direction, a frequency resolution is low in the spatiotemporal covariance matrix calculated based on the power average. Therefore, estimation accuracy of the reverberation suppression filter may deteriorate.

In order to avoid this, the power $\lambda_{t,f}^{(j)}$ of the sound source j different for each frequency may be used in the calculation of the spatiotemporal covariance matrix used to estimate the reverberation suppression filter.

Specifically, the sound source separation unit 4 may further obtain the power $\lambda_{t,f}^{(j)}$ of the sound source j used in the calculation of the spatiotemporal covariance matrix by the following expression.

$$\lambda_{t,f}^{(j)}=|y_{t,f}^{(j)}|^2 \text{ for } \in [1, J] \qquad \text{[Math. 12]}$$

In this case, instead of the power $\lambda_t^{(j)}$ of the sound source j, the power $\lambda_{t,f}^{(j)}$ of the sound source j different for each frequency is output to the spatiotemporal covariance matrix estimation unit 2.

Then, the spatiotemporal covariance matrix estimation unit 2 estimates the spatiotemporal covariance matrices $R_f^{(j)}$ and $P_f^{(j)}$ based on, for example, the following expression. Here, for example, it is assumed that the noise power $\lambda_t^{(J+1)}=1$.

$$R_f^{(j)}=\Sigma_t\overline{X}_{t-D}\overline{X}_{t-D}{}^H/\lambda_{t,f}^{(j)}$$

$$P_f^{(j)}=\Sigma_t\overline{X}_{t-D}X_t{}^H/\lambda_{t,f}^{(j)} \qquad \text{[Math. 13]}$$

Accordingly, the reverberation suppression filter can be estimated without a decrease in the frequency resolution.

On the other hand, in the process of the sound source separation unit 4, the power $\lambda_t^{(j)}$ of the sound source j calculated based on Expression (C) is used.

The power $\lambda_{t,f}^{(j)}$ of the target sound obtained using another means such as a neural network may be used as prior information.

Specifically, it is first assumed that the power of the target sound takes a different value for each time-frequency point and is represented by $\lambda_{t,f}^{(j)}$. Then, the prior distribution is modeled by an inverse gamma distribution, and $\gamma_{t,f}^{(j)}$ is set as a scale parameter. For example, $\gamma_{t,f}^{(j)}$ is power of the target sound obtained using only another means such as a neural network (that is, prior information of the power of the target sound).

As a result, in the sound source separation noise suppression step, the power of the target sound can be updated by the following expression. α is a shape parameter of the inverse gamma distribution and for example, α=1.

[Math. 14]

$$\lambda_{t,f}^{(j)} = \frac{\left|y_{t,f}^{(j)}\right|^2 + \gamma_{t,f}^{(j)}}{\alpha + 2} \quad \text{for } j \in [1, J]$$

The sound source separation unit 4 may obtain the power $\lambda_{t,f}^{(j)}$ of the sound source j based on this expression.

In this case, instead of the power $\lambda_t^{(j)}$ of the sound source j, the power $\lambda_{t,f}^{(j)}$ of the sound source j different for each frequency is output to the spatiotemporal covariance matrix estimation unit 2.

Then, the spatiotemporal covariance matrix estimation unit 2 estimates the spatiotemporal covariance matrices $R_f^{(j)}$ and $P_f^{(j)}$ based on, for example, the following expression. Here, for example, it is assumed that the noise power $\lambda_t^{(J+1)}=1$.

$$R_f^{(j)}=\Sigma_t \bar{X}_{t-D} \bar{X}_{t-D}^H / \lambda_{t,f}^{(j)}$$

$$P_f^{(j)}=\Sigma_t \bar{X}_{t-D} X_t^H / \lambda_{t,f}^{(j)} \quad \text{[Math. 15]}$$

Further, in this case, the sound source separation unit 4 obtains the spatial covariance matrix $\Sigma_f^{(j)}$ corresponding to the sound source j based on, for example, the following expression.

$$\Sigma_f^{(j)}=\Sigma_t Z_{t,f}^{(j)} (Z_{t,f}^{(j)})^H / \lambda_{t,f}^{(j)} \quad \text{[Math. 16]}$$

Second Embodiment

Unlike the acoustic signal enhancement device of the first embodiment, the acoustic signal enhancement device of the second embodiment simultaneously suppresses reverberation of all sound sources by using a reverberation suppression filter $G_f$ common to all sound sources, and obtains a reverberation suppression signal vector $Z_{t,f} \in C^{M \times 1}$ common to all the sound sources.

Hereinafter, differences from those of the acoustic signal enhancement device according to the first embodiment will be mainly described. The same portions as those of the first embodiment will not be described repeatedly.

Figure 3:
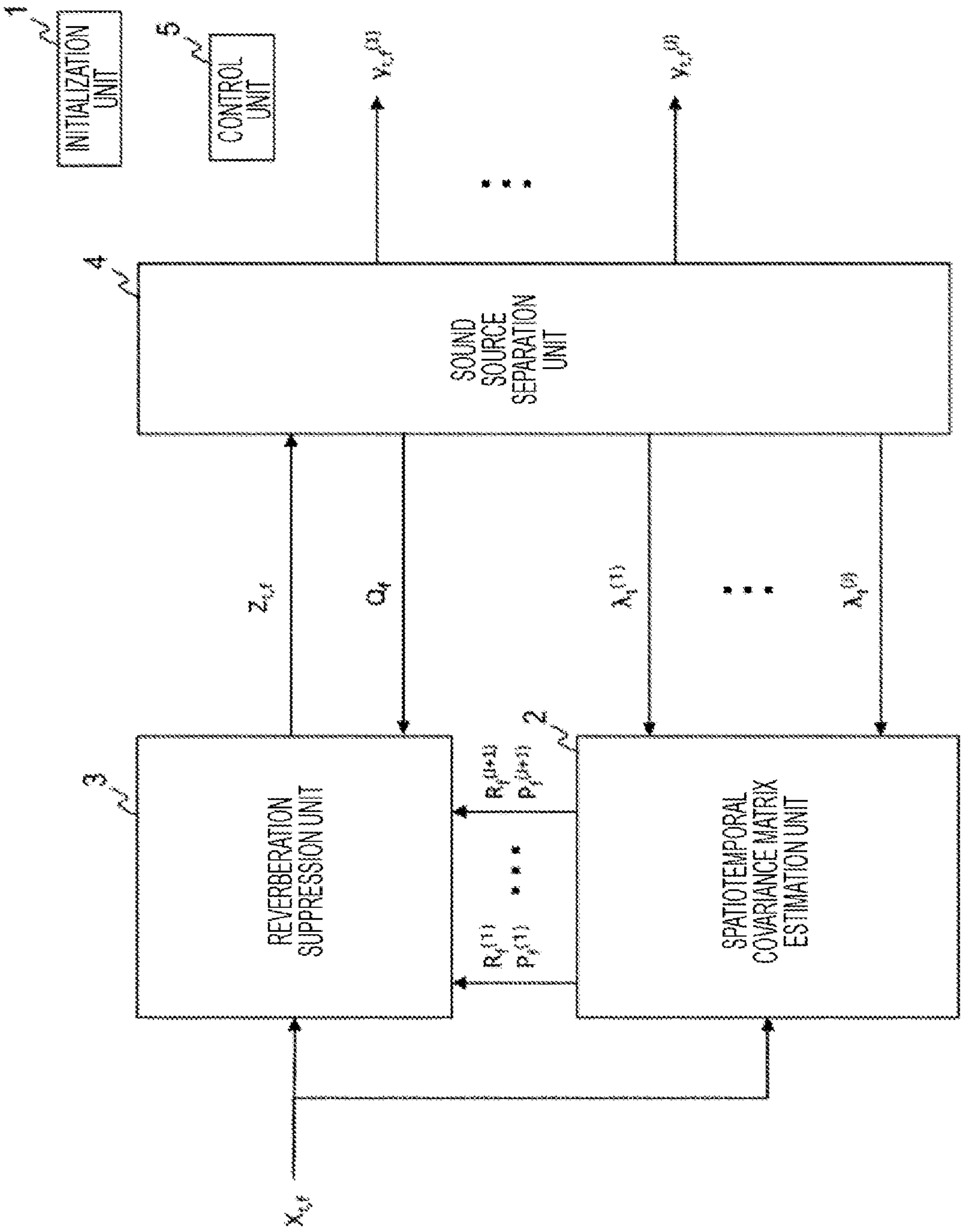
FIG. 3 is a diagram illustrating an example of a functional configuration of an acoustic signal enhancement device according to a second embodiment.
Figure 4:
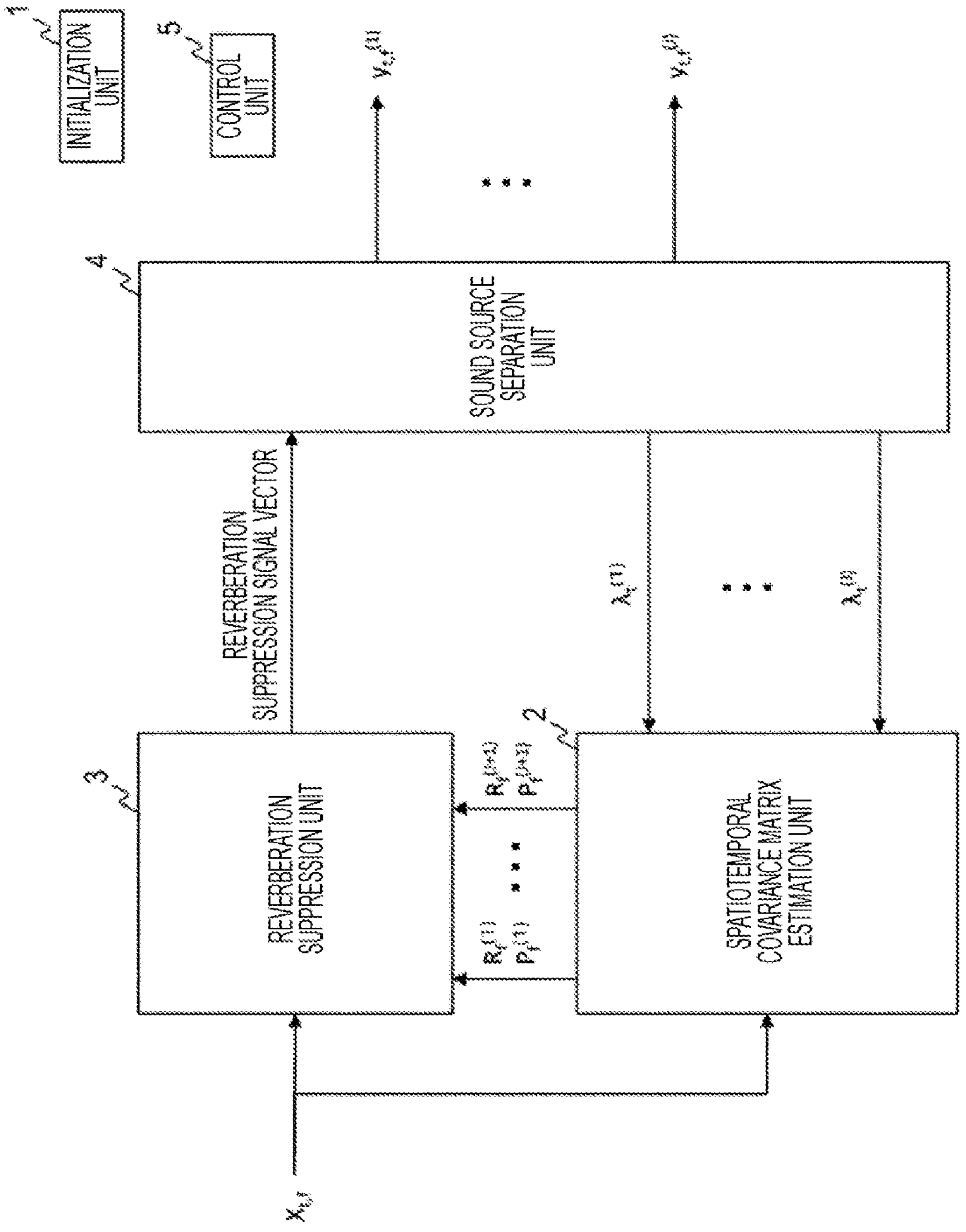
FIG. 4 is a diagram illustrating an example of a functional configuration of an acoustic signal enhancement device of a superordinate concept of the first and second embodiments.

Like the acoustic signal enhancement device according to the first embodiment, as illustrated in FIG. 3, the acoustic signal enhancement device according to the second embodiment includes, for example, an initialization unit 1, a spatiotemporal covariance matrix estimation unit 2, a reverberation suppression unit 3, a sound source separation unit 4, and a control unit 5.

<Initialization Unit 1>

A process of the initialization unit 1 is similar to that of the first embodiment.

<Spatiotemporal Covariance Matrix Estimation Unit 2>

A process of the spatiotemporal covariance matrix estimation unit 2 is similar to that of the first embodiment.

<Reverberation Suppression Unit 3>

Like the first embodiment, the spatiotemporal covariance matrices $R_f^{(j)}$ and $P_f^{(j)}$ estimated by the spatiotemporal covariance matrix estimation unit 2 and the observation signal vectors $X_{t,f}$ formed from the observation signals $x_{t,f}^{(m)}$ of the microphone m are input to the reverberation suppression unit 3. Further, in the second embodiment, the separation matrix $Q_f$ initialized by the initialization unit 1 and the separation matrix $Q_f$ updated by the sound source separation unit 4 are input to the reverberation suppression unit 3.

For each sound source j, the reverberation suppression unit 3 obtains the reverberation suppression filter $G_f^{(j)}$ of the sound source j using the estimated spatiotemporal covariance matrices $R_f^{(j)}$ and $P_f^{(j)}$, obtains the reverberation suppression filter $G_f$ common to all the sound sources from the obtained reverberation suppression filter $G_f^{(j)}$, and generates the reverberation suppression signal vector $Z_{t,f}$ formed from the reverberation suppression signal $z_{t,f}^{(m)}$ corresponding to the observation signal $x_{t,f}^{(m)}$ using the obtained reverberation suppression filter $G_f$ and the observation signal vector $X_{t,f}$ (step S3).

Here, $Z_{t,f}=[z_{t,f}^{(1)}, \ldots, z_{t,f}^{(M)}]$. The reverberation suppression signal vector $Z_{t,f}$ can also be said to be a reverberation suppression sound common to all the sound sources.

The generated reverberation suppression signal vector $Z_{t,f}$ is output to the sound source separation unit 4.

The reverberation suppression unit 3 obtains the reverberation suppression filter $G_f^{(j)}$ of the sound source j, as in the first embodiment.

The reverberation suppression unit 3 obtains the reverberation suppression filter $G_f$ common to all the sound sources based on, for example, the following expression.

$$G_f=[G_j^{(1)}Q_f^{(1)}, \ldots, G_f^{(j)}Q_f^{j}, G_f^{(J+1)}Q_{N,f}]Q_f^{-1} \quad \text{[Math. 17]}$$

The reverberation suppression unit 3 generates a reverberation suppression signal vector $Z_{t,f}$ based on, for example, the following expression.

$$Z_{t,f}=X_{t,f}-G_f^H \bar{X}_{t-D,f} \quad \text{[Math. 18]}$$

<Sound Source Separation Unit 4>

The reverberation suppression signal vector $Z_{t,f}$ generated by the reverberation suppression unit 3 is input to the sound source separation unit 4.

The sound source separation unit 4 obtains the enhanced sound $y_{t,f}^{(j)}$ of the sound source j and the power $\lambda_t^{(j)}$ of the sound source j using the reverberation suppression signal vector $Z_{t,f}$ generated by the reverberation suppression unit 3 for each sound source j (where 1≤j≤J) corresponding to the target sound (step S4).

For example, the sound source separation unit 4 finally obtains the enhanced sound $y_{t,f}^{(j)}$ of the sound source j by repeating: (1) a process of obtaining the spatial covariance matrix $\Sigma_f^{(j)}$ corresponding to the sound source j using the generated reverberation suppression signal vector $Z_{t,f}$ and the power of the sound source j; (2) a process of updating a separation filter $Q_f^{(j)}$ corresponding to the sound source j using the obtained spatial covariance matrix $\Sigma_f^{(j)}$, updating the enhanced sound $y_{t,f}^{(j)}$ of the sound source j using the updated separation filter $Q_f^{(j)}$ and the generated reverberation suppression signal vector $Z_{t,f}$, and updating the power of the sound source j using the updated enhanced sound $y_{t,f}^{(j)}$; and (3) a process of updating the noise separation matrix $Q_{N,f}$ using the updated separation filter $Q_f^{(j)}$.

That is, the sound source separation unit 4 finally obtains the enhanced sounds $y_{t,f}^{(1)}, \ldots y_{t,f}^{(J)}$ of the sound sources 1, . . . , J by repeating: (1) a process of obtaining the spatial covariance matrices $\Sigma_f^{(1)}, \ldots, \Sigma_f^{(J+1)}$ corresponding to the sound sources 1, . . . , J+1 using the generated reverberation suppression signal vector $Z_{t,f}$ and the power $\lambda_t^{(1)}, \ldots, \lambda_t^{(J+1)}$ of the sound sources 1, . . . , J+1; (2) a process of updating the separation filters $Q_f^{(1)}, \ldots, Q_f^{(J)}$ corresponding to the sound sources 1, . . . , J using the obtained spatial covariance matrices $\Sigma_f^{(1)}, \ldots, \Sigma_f^{(J)}$, updating the enhanced sounds $y_{t,f}^{(1)}, \ldots, y_{t,f}^{(J)}$ of the sound sources 1, . . . , J using the updated separation filters $Q_f^{(1)}, \ldots, Q_f^{(J)}$ and the reverberation suppression signal vector $Z_{t,f}$ and updating the power $\lambda_t^{(1)}, \ldots, \lambda_t^{(J)}$ of the sound sources 1, . . . , J using the updated enhanced sounds $y_{t,f}^{(1)}, \ldots, y_{t,f}^{(J)}$; and (3) a process of updating the noise separation matrix $Q_{N,f}$ using the updated separation filters $Q_f^{(1)}, \ldots, Q_f^{(J)}$.

Unlike the first embodiment, the sound source separation unit 4 according to the second embodiment obtains a spatial covariance matrix $\Sigma_f^{(j)}$ based on, for example, the following expression.

$$\Sigma_f^{(j)}=\Sigma_t Z_{t,f}(Z_{t,f})^H/\lambda_t^{(j)} \quad \text{[Math. 19]}$$

Unlike the first embodiment, the sound source separation unit 4 according to the second embodiment updates the enhanced sound $y_{t,f}^{(j)}$ of the sound source j based on the following expression, for example.

$$y_{t,f}=Q_f^R Z_{t,f} \quad \text{[Math. 20]}$$

$$y_{t,f}^{(j)}=(Q_f^{(j)})^H Z_{t,f} \ldots (B') \quad \text{[Math. 21]}$$

Further, unlike the first embodiment, the sound source separation unit 4 according to the second embodiment outputs the updated separation matrix $Q_f$ to the reverberation suppression unit 3.

The other processes of the sound source separation unit 4 is similar to those of the first embodiment.

<Control UNIT 5>

The process of the control unit 5 is similar to that of the first embodiment.

[Experimental Results]

Noise suppression, reverberation suppression, and sound source separation were performed by the acoustic signal enhancement device according to the first embodiment from an observation signal in which sounds spoken by two persons in an environment where there were noise and reverberation were simultaneously recorded by eight microphones.

An average word error rate of speech recognition in a case where the acoustic signal enhancement process was not performed was 62.49%. Further, an average word error rate of speech recognition in a case where the acoustic signal enhancement by a method of the related art was performed was 19.54%.

On the other hand, an average word error rate of speech recognition in a case where acoustic signal enhancement was performed by the acoustic signal enhancement device according to the first embodiment was 25.65%, an average word error rate of speech recognition in a case where the acoustic signal enhancement was performed by the acoustic signal enhancement device according to the first modification of the first embodiment was 16.31%, and an average word error rate of speech recognition in a case where the acoustic signal enhancement was performed by the acoustic signal enhancement device according to a first modified example of the first embodiment was 13.24%.

From these results, it can be understood that the optimum process can be performed as a whole by the above-described acoustic signal enhancement device, and the acoustic signal enhancement can be performed more efficiently than in the related art.

[Modified Example]

While the embodiments of the present invention have been described above, specific configurations are not limited to these embodiments, and it is needless to say that appropriate design changes, and the like, are included in the present invention within the scope of the present invention without deviating from the gist of the present invention.

The various processes described in the embodiments may be executed not only in chronological order according to the described order, but also in parallel or individually according to the processing capability of a device that executes the processes or as necessary.

For example, data exchange between constituent units of the acoustic signal enhancement device may be performed directly or via a storage unit (not illustrated).

[Program and Recording Medium]

Figure 5:
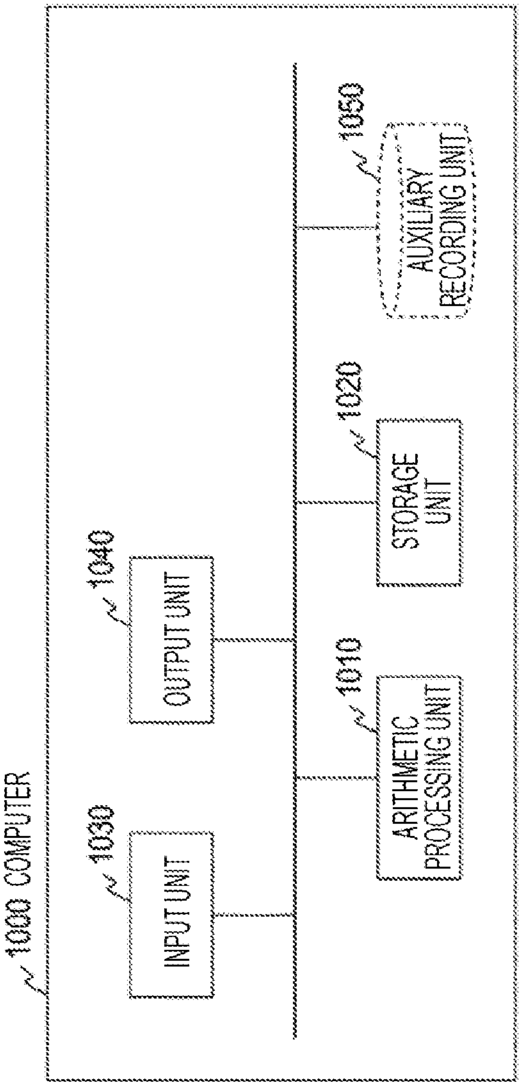
FIG. 5 is a diagram illustrating a functional configuration example of a computer.
Figure 6:
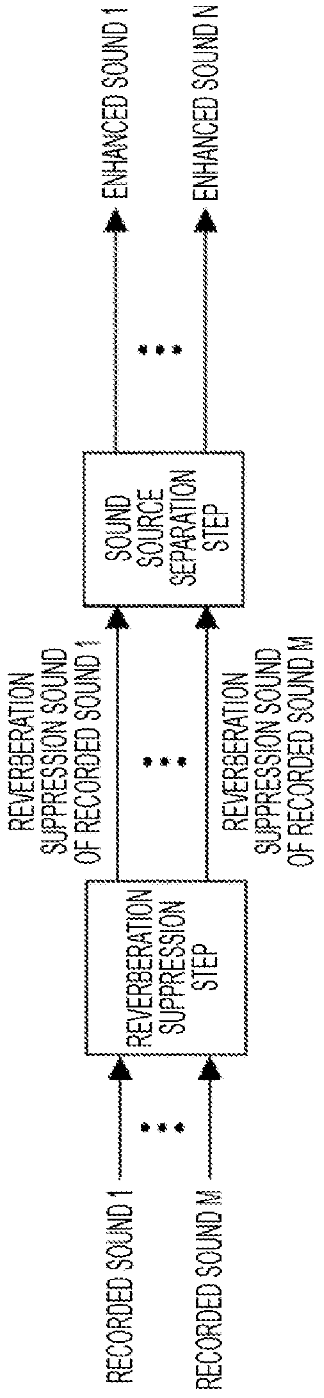
FIG. 6 is a diagram for describing the background art.

The process of each unit of each of the above-described devices may be implemented by a computer. In this case, processing content of a function of each device is described by a program. By causing a storage unit 1020 of a computer 1000 illustrated in FIG. 5 to read this program and causing an arithmetic processing unit 1010, an input unit 1030, an output unit 1040, and the like to execute the program, various kinds of processing functions in each of the foregoing devices are implemented on the computer.

The program describing the processing content may be recorded on a computer-readable recording medium. The computer-readable recording medium is, for example, a non-transitory recording medium and is specifically a magnetic recording device, an optical disk, or the like.

Distribution of the program is performed by, for example, selling, transferring, or renting a portable recording medium such as a DVD or a CD-ROM on which the program is recorded. Further, a configuration in which the program is stored in a storage device in a server computer and the program is distributed by transferring the program from the server computer to other computers via a network may also be employed.

For example, the computer that executes such a program first temporarily stores the program recorded in a portable recording medium or the program transferred from the server computer in an auxiliary recording unit 1050 that is a non-transitory storage device of the computer. Then, when a process is performed, the computer reads the program stored in the auxiliary recording unit 1050, which is the non-temporary storage device of the computer, to the storage unit 1020 and executes the process in accordance with the read program. As another embodiment of the program, the computer may directly read the program from the portable recording medium to the storage unit 1020 and execute a process in accordance with the program, and furthermore, the computer may sequentially execute a process in accordance with the received program whenever the program is transferred from the server computer to the computer. The above-described process may be executed by a so-called application service provider (ASP) type service that implements a processing function only in response to an execution instruction and result acquisition without transferring the program from the server computer to the computer. The program according to the present embodiment includes information used for a process by an electronic computer and equivalent to the program (data or the like that is not a direct command to the computer but has a property that defines a process of the computer).

Although the present device is configured by executing a predetermined program on a computer in the present embodiment, at least part of the processing content may be implemented by hardware.

In addition, it is needless to say that modifications can be appropriately made without departing from the gist of the present invention.

The invention claimed is:

1. An acoustic signal enhancement device comprising: processing circuitry configured to:

estimate spatiotemporal covariance matrices $R_f^{(j)}$ and $P_f^{(j)}$ using power $\lambda_t^{(j)}$ of a sound source j and an observation signal vector $X_{t,f}$ formed from an observation signal $X_{t,f}^{(m)}$ of a microphone m for each sound source j when t is a time frame number, f is a frequency number, M is the number of microphones, m=1, . . . , M, there are a target sound and noise in the sound source, J is the number of target sounds, M>J, j=1, . . . , J+1, j of 1≤j≤J indicates a sound source corresponding to the target sound, and J+1 indicates a sound source corresponding to the noise;

obtain a reverberation suppression filter $G_f^{(j)}$ of the sound source j using the estimated spatiotemporal covariance matrices $R_f^{(j)}$ and $P_f^{(j)}$ for each sound source j and to generate a reverberation suppression signal vector using the obtained reverberation suppression filter $G_f^{(j)}$ and the observation signal vectors $X_{t,f}$, obtain an enhanced sound $y_{t,f}^{(j)}$ of the sound source j and power of the sound source j using the generated reverberation suppression signal vector for each sound source j (where 1≤j≤J) corresponding to the target sound; and perform control such that processes of the processing circuitry are repeatedly performed.

2. The acoustic signal enhancement device according to claim 1, wherein the processing circuitry further configured to obtain the reverberation suppression filter $G_f^{(j)}$ of the sound source j using the estimated spatiotemporal covariance matrices $R_f^{(j)}$ and $P_f^{(j)}$ for each sound source j, and generate a reverberation suppression signal vector $Z_{t,f}^{(1)}$ corresponding to an observation signal $X_{t,f}^{(m)}$ regarding an enhanced sound of the sound source j using the obtained reverberation suppression filter $G_f^{(j)}$ and the observation signal vector $X_{t,f}$, and the processing circuitry further configured to obtain the enhanced sound $y_{t,f}^{(j)}$ of the sound source j and the power of the sound source j using the generated reverberation suppression signal vector $Z_{t,f}^{(j)}$ for each sound source j (where 1≤j≤J) corresponding to the target sound.

3. The acoustic signal enhancement device according to claim 2, wherein the processing circuitry further configured to obtain the enhanced sound $y_{t,f}^{(j)}$ of the sound source j by repeating (1) a process of obtaining a spatial covariance matrix $\Sigma_f^{(j)}$ corresponding to the sound source j using the generated reverberation suppression signal vector $Z_{t,f}^{(j)}$ and the power of the sound source j, (2) a process of updating a separation filter $Q_f^{(j)}$ corresponding to the sound source j using the obtained spatial covariance matrix $\Sigma_f^{(j)}$, updating the enhanced sound $y_{t,f}^{(j)}$ of the sound source j using the updated separation filter $Q_f^{(j)}$ and the generated reverberation suppression signal vector $Z_{t,f}^{(j)}$, and updating the power of the sound source j using the updated enhanced sound $y_{t,f}^{(j)}$, and (3) a process of updating the noise separation matrix $Q_{N,f}$ using the updated separation filter $Q_f^{(j)}$.

4. The acoustic signal enhancement device according to claim 1, wherein the processing circuitry further configured to obtain the reverberation suppression filter $G_f^{(j)}$ of the sound source j using the estimated spatiotemporal covariance matrices $R_f^{(j)}$ and $P_f^{(j)}$ for each sound source j, obtain a reverberation suppression filter $G_f$ common to all sound sources from the obtained reverberation suppression filter $G_f^{(j)}$, and generate a reverberation suppression signal vector $Z_{t,f}$ formed from a reverberation suppression signal $z_{t,f}^{(m)}$ corresponding to an observation signal $x_{t,f}^{(m)}$ using the obtained reverberation suppression filter Grand the observation signal vector $X_{t,f}$, and the processing circuitry further configured to obtain the enhanced sound $y_{t,f}^{(j)}$ of the sound source j and the power of the sound source j using the generated reverberation suppression signal vector $Z_{t,f}$ for each sound source j (where 1≤j≤J) corresponding to the target sound.

5. The acoustic signal enhancement device according to claim 4, wherein the processing circuitry further configured to finally obtain the enhanced sound $y_{t,f}^{(j)}$ of the sound source j by repeating (1) a process of obtaining a spatial covariance matrix $\Sigma_f^{(j)}$ corresponding to the sound source j using the generated reverberation suppression signal vector $Z_{t,f}$ and the power of the sound source j, (2) a process of updating a separation filter $Q_f^{(j)}$ corresponding to the sound source j using the obtained spatial covariance matrix $\Sigma_f^{(j)}$, updating the enhanced sound $y_{t,f}^{(j)}$ of the sound source j using the updated separation filter $Q_f^{(j)}$ and the generated reverberation suppression signal vector $Z_{t,f}$, and updating the power of the sound source j using the updated enhanced sound $y_{t,f}^{(j)}$, and (3) a process of updating the noise separation matrix $Q_{N,f}$ using the updated separation filter $Q_f^{(j)}$.

6. An acoustic signal enhancement method comprising:

a spatiotemporal covariance matrix estimation step of estimating spatiotemporal covariance matrices $R_f^{(j)}$ and $P_f^{(j)}$ using power of a sound source j and an observation signal vector $X_{t,f}$ formed from an observation signal $x_{t,f}^{(m)}$ of a microphone m for each sound source j by a spatiotemporal covariance matrix estimation unit when t is a time frame number, f is a frequency number, M is the number of microphones, m=1, . . . , M, there are a target sound and noise in the sound source, J is the number of target sounds, M>J, j=1, . . . , J+1, j of 1≤j≤J indicates a sound source corresponding to the target sound, and J+1 indicates a sound source corresponding to the noise;

a reverberation suppression step of obtaining a reverberation suppression filter $G_f^{(j)}$ of the sound source j using the estimated spatiotemporal covariance matrices $R_f^{(j)}$ and $P_f^{(j)}$ for each sound source j and generating a reverberation suppression signal vector using the obtained reverberation suppression filter $G_f^{(j)}$ and the observation signal vectors $X_{t,f}$ by a reverberation suppression unit;

a sound source separation step of obtaining an enhanced sound $y_{t,f}^{(j)}$ of the sound source j and power of the sound source j using the generated reverberation suppression signal vector for each sound source j (where $1 \leq j \leq J$) corresponding to the target sound by a sound source separation unit; and a control step of performing control by a control unit such that a process of the spatiotemporal covariance matrix estimation unit, a process of the reverberation suppression unit, and a process of the sound source separation unit are repeatedly performed.

7. A non-transitory computer-readable recording medium storing a computer-executable program instructions that when executed by a processor cause causing a computer to execute operations comprising:

a spatiotemporal covariance matrix estimation step of estimating spatiotemporal covariance matrices $R_f^{(j)}$ and $P_f^{(j)}$ using power of a sound source j and an observation signal vector $X_{t,f}$ formed from an observation signal $x_{t,f}^{(m)}$ of a microphone m for each sound source i by a spatiotemporal covariance matrix estimation unit when t is a time frame number, f is a frequency number, M is the number of microphones, m=1, . . . , M, there are a target sound and noise in the sound source, J is the number of target sounds, M>J, j=1, . . . , J+1, j of $1 \leq j \leq J$ indicates a sound source corresponding to the target sound, and J+1 indicates a sound source corresponding to the noise;

a reverberation suppression step of obtaining a reverberation suppression filter $G_f^{(j)}$ of the sound source j using the estimated spatiotemporal covariance matrices $R_f^{(j)}$ and $P_f^{(j)}$ for each sound source j and generating a reverberation suppression signal vector using the obtained reverberation suppression filter $G_f^{(j)}$ and the observation signal vectors $X_{t,f}$ by a reverberation suppression unit;

a sound source separation step of obtaining an enhanced sound $y_{t,f}^{(j)}$ of the sound source j and power of the sound source j using the generated reverberation suppression signal vector for each sound source j (where $1<j \leq J$) corresponding to the target sound by a sound source separation unit; and a control step of performing control by a control unit such that a process of the spatiotemporal covariance matrix estimation unit, a process of the reverberation suppression unit, and a process of the sound source separation unit are repeatedly performed.

* * * * *